(12) United States Patent
Hager et al.

(10) Patent No.: US 7,435,909 B2
(45) Date of Patent: *Oct. 14, 2008

(54) LOW COST, HIGH PERFORMANCE FLEXIBLE REINFORCEMENT FOR COMMUNICATIONS CABLE

(75) Inventors: Thomas P. Hager, Westerville, OH (US); Richard N. Lehman, Newark, OH (US); James R. Priest, Nashport, OH (US)

(73) Assignee: Neptco JV LLC, Pawtucket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/331,900

(22) Filed: Dec. 30, 2002

(65) Prior Publication Data

US 2004/0050580 A1   Mar. 18, 2004

Related U.S. Application Data

(63) Continuation-in-part of application No. 10/246,007, filed on Sep. 18, 2002, now abandoned.

(51) Int. Cl.
*H01B 7/00* (2006.01)

(52) U.S. Cl. ............ 174/116; 174/36; 174/117 A; 174/120 R; 174/121 R; 174/122 G; 174/122 C; 174/120 C

(58) Field of Classification Search ............ 174/116, 174/36, 117 A, 117 M, 120 R, 121 R, 122 G, 174/122 C, 120 C
See application file for complete search history.

(56) References Cited

U.S. PATENT DOCUMENTS

| | | | | |
|---|---|---|---|---|
| 3,765,927 A | * | 10/1973 | Marzocchi | 427/407.3 |
| 4,781,432 A | | 11/1988 | Zongor et al. | |
| 4,837,077 A | * | 6/1989 | Anton et al. | 442/118 |
| 4,874,219 A | * | 10/1989 | Arroyo et al. | 385/107 |
| 4,921,558 A | * | 5/1990 | Johnson et al. | 156/181 |
| 5,182,784 A | * | 1/1993 | Hager et al. | 385/128 |
| 5,512,625 A | | 4/1996 | Butterbach et al. | 524/490 |
| 6,195,486 B1 | * | 2/2001 | Field et al. | 385/100 |
| 6,238,791 B1 | * | 5/2001 | Schell et al. | 428/392 |
| 2001/0016619 A1 | * | 8/2001 | Flautt et al. | 524/500 |

FOREIGN PATENT DOCUMENTS

| | | |
|---|---|---|
| EP | 0 291 023 | 11/1988 |
| EP | 0 685 855 | 12/1995 |
| EP | 1 076 253 | 2/2001 |
| GB | 1 485 253 | 9/1977 |
| JP | 01022982 A * | 1/1989 |

OTHER PUBLICATIONS

Abstract in English of JP 01022982A-Derwent Acc No. 1989-071749.*

H.-H. Shih and G.R. Hamed—"Peel Adhesion and Viscoelasticity of Poly (ethylene-co-vinyl acetate)-Based Hot Melt Adhisvies. I. The Effect of Tackifier Compatibility"—Journal of Applied Polymer Science, John Wyley and Sons Inc., New York, Vol. 63, No. 3, Jan. 18, 1997, pp. 323-331.

* cited by examiner

*Primary Examiner*—Jinhee Lee
(74) *Attorney, Agent, or Firm*—Mintz, Levin, Cohn, Ferris, Glovsky and Popeo, P.C.

(57) ABSTRACT

A low cost, high performance flexible reinforcement member that can be used for both optical and copper communications cable. The reinforcement members made according to the preferred process are more rigid than known reinforcement members, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques.

14 Claims, 14 Drawing Sheets

US 7,435,909 B2

LOW COST, HIGH PERFORMANCE FLEXIBLE REINFORCEMENT FOR COMMUNICATIONS CABLE

CROSS-REFERENCE TO RELATED APPLICATIONS

This application is a continuation-in-part of U.S. patent application Ser. No. 10/246,007, filed Sep. 18, 2002.

TECHNICAL FIELD AND INDUSTRIAL APPLICABILITY OF THE INVENTION

The present invention relates generally to reinforced communication cables and more specifically to low cost, high performance flexible reinforcement for communications cables.

BACKGROUND OF THE INVENTION

The market for telecommunications cable and related products is in an over capacity state. The large number of suppliers of these products has put tremendous pressure on the industry to provide communications cable with increased performance at lower costs.

Optical communications cables consist essentially of a plurality of randomly placed optical communication fibers, typically in ribbon form, contained within a polymer jacket. Of course, other types of communications cables can have single optical fibers, bundled optical fibers, or tight buffered optical fibers. The fibers are typically tight or loose buffered within a polymer tube contained within a portion of the jacket. One or more flexible reinforcement members and stiff strength members may also be contained within a portion of the polymer jacket outside of the central tube or buffer tubes to provide support and prevent kinking of the communication fibers. These reinforcement members are applied by being wrapped helically around the inner core prior to outer jacketing (as in optical loose tube cable types) or are directly extruded into the jacket matrix (as in twisted copper telephone cable).

The flexible reinforcements for cables are made in a wide variety of methods. Typically, these reinforcements are manufactured by first applying a binder and sizing containing a film former and oils or coupling agents to a glass strand and then applying a relatively heavy layer of a water-based, high molecular weight polymer latex or wax. The coated strands may then be introduced to the communications cables by known methods.

These coatings may impart many important properties to the flexible reinforcements both during manufacture and after introduction to the cable. For example, these coatings prevent abrasion of the glass fibers during the combination with the reinforcement and during deployment. Also, these coatings prevent adhesion of the reinforcing fibers to the polymer jacket. These coatings may also impart adhesion if desired to the polymer jacket, for example, as is the case with polyvinyl chloride (PVC) jacketed communications cables. Additionally, these coatings can be super absorbent and can thus prevent water seepage from damaging the optical fibers.

One problem with presently available reinforcements is that they are relatively expensive to manufacture. For example, a relatively heavy layer of high molecular weight polymer latex or wax must be applied to the fibers in order to impart the mechanical properties necessary for optical and copper telecommunications cables. Also, these high molecular weight polymers have extremely high melt viscosities. Further, air can be trapped within the interstices of the fibers themselves after the introduction of the high molecular weight polymers, which can lead to premature degradation of the fibers and strand deficiencies.

Also, because water-based high molecular weight coatings are typically used, a high-energy water-removal step is required before the fiber reinforcements can be introduced into the cabling. These water-based coatings, typically in emulsion form, are expensive as well.

SUMMARY OF THE INVENTION

A low cost, high performance flexible glass reinforcement member is provided that can be used for both optical and copper communications cables. The reinforcement members made according to the preferred process are more rigid than glass reinforcement members made according to the prior art as described above, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques such as blowing-in installation.

This flexible reinforcement member is made in one of two distinct methods. In a first preferred embodiment, the member is made by first melting and then applying a low molecular weight, low melt viscosity thermoplastic material, such as modified or unmodified polyethylene or wax, to fiber material. The fiber material can be a glass strand or bundle, or combination of strand and bundle that penetrates the interstices within and between the fibers. Glass fibers that may be used include E-type glass fibers or ECR-type glass fibers such as Advantex® type glass fibers, both available from Owens Corning. Additionally, other fibrous materials can be used such as: duPont de Nemours Kevlar® aramid or Teijin Twaron® aramid; Toyobo Zylon® poly(p-phenylene-2,6-benzobisoxazole)(PBO); carbon fibers such as Hercules polyacrylonitrile Magnamite carbon fibers; high silica glass such as S-2 Glass®, Zentron®, Vetron® or other high strength glass from Advanced Glass Yarns (Aiken, S.C.) or other glass manufacturers; high tenacity, linear, high molecular weight polyethylene Spectra® fiber from Honeywell Performance Fibers (Colonial Heights, Va.); or other high modulus reinforcements. The term "high modulus" is defined as the modulus of elasticity, also known as Young's Modulus, which is a coefficient of elasticity representing the ratio of stress to strain as a material is deformed under dynamic load. It is the measure of softness or stiffness of a material. In the case of "high modulus" reinforcements, the values for the stress to strain ratio will typically exceed 30 Giga Pascals (GPa). For the above examples, the typical elastic modulus of each are as follows: E-Glass=72 GPa; aramid=124 GPa (depending on aramid type); PBO=280 GPa; carbon fibers=228 GPa; S-2 Glass® fiber=90 GPa; linearized polyethylene fiber=113 GPa.

This wax material is air cooled prior to the introduction of a second layer of nonwater-based high molecular weight ("MW") polymer, such as ethylene acrylic acid (EAA), that is applied to the strand in an extruder or similar device. The high molecular weight polymer surrounds the strands, but does not penetrate. The high MW polymer is tough, but flexible, and gives the strand mechanical properties for use in cable systems. The overall amount of high MW polymer applied to the strand is less than is present in cables of the prior art.

In another preferred embodiment, the member is made by first applying a low molecular weight, thermoplastic blend of a blend of low molecular weight, low melt viscosity and high molecular, relatively high melt viscosity thermoplastic or thermoplastic elastomeric material to the fiber material. An example of this is a blend of microcrystalline wax and a plasticized styrene butadiene rubber. The blend penetrates the interstices within and between the fibers to form a member having adequate mechanical properties. As a topcoat is not needed, a cost savings is realized in terms of manufacturing and raw material costs. Of course, a topcoat could still be applied if so desired.

In another preferred embodiment, the high molecular weight topcoat is applied to an uncoated fiber or bundle, i.e., the first coating step is omitted. By omitting the first coating step and coating with the high molecular topcoat, the fiber or bundle is softer and thus more conformable as it is wrapped around the cable core during cable manufacturing. Further, additional cost savings are incurred in terms of raw materials and manufacturing.

Alternatively, the high molecular weight topcoat may be applied to a fiber or bundle that has been previously coated in an offline process, The coatings include, but are not limited to, polymer coatings including thermoplastic coatings, sizing (such as starch/oil or epoxy/silane), finishes, waxes, curing agents, and conventional thermosetting resins including, but not limited to, epoxies, polyimide, vinyl esters and acrylics.

This flexible reinforcement made according to these preferred processes exhibit lower amounts of trapped air that is typically trapped within the strands and/or bundles, thereby decreasing the likelihood and amount of potential degradation within the fiber. The method also prevents strand deficiencies such as fiber-fiber abrasion and water penetration, and can thereby increase the strength of the strands, and hence the reinforcement, without the application of a heavy layer of high MW polymer. Further, by not using a water-based coating, additional savings is realized by both in terms of the water removal and raw material costs.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
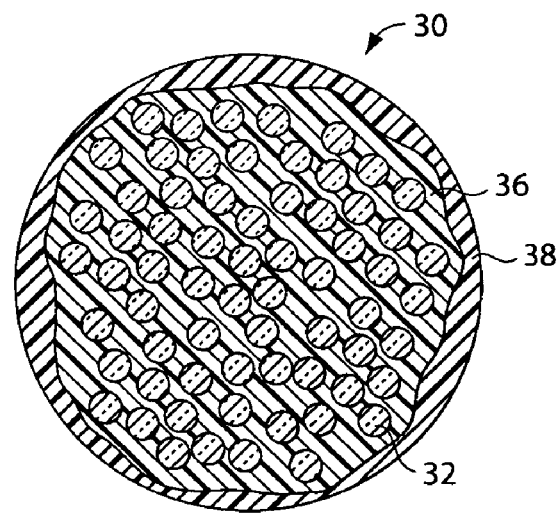
FIG. 1 is a cross-sectional view of a flexible reinforcement member according to a preferred embodiment of the present invention.
Figure 2:
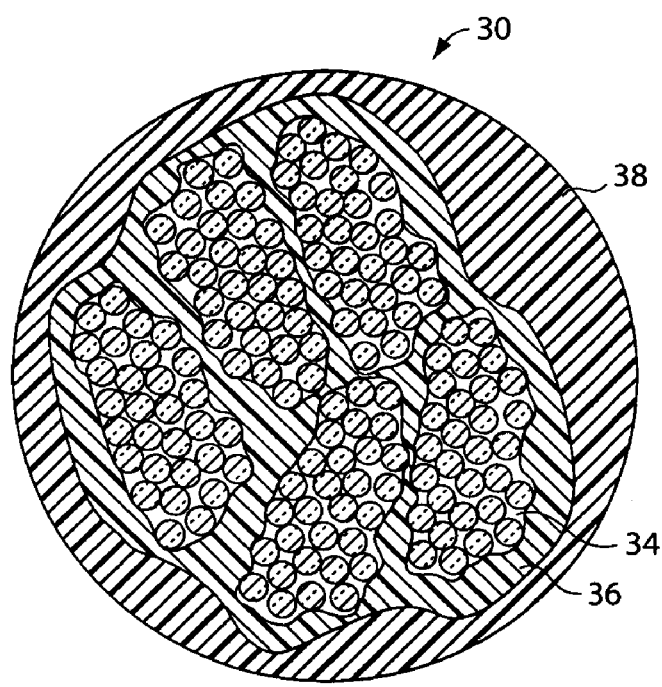
FIG. 2 is a cross-sectional view of a flexible reinforcement member according to a preferred embodiment of the present invention.
Figure 3:
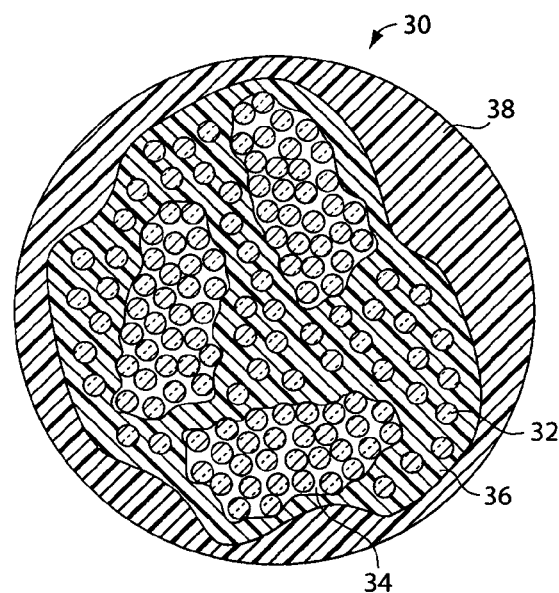
FIG. 3 is a cross-sectional view of a flexible reinforcement member according to a preferred embodiment of the present invention.

The present invention relates to a new flexible reinforcement member that may be used in telecommunication cables such as optical cables or copper cables. FIGS. 1-3 below illustrate three preferred embodiments of the flexible reinforcement member.

FIG. 1 illustrates a cross-sectional view of the flexible reinforcement member 30 according to a preferred embodiment of the present invention. The member 30 is comprised of a strand having a plurality of single filaments 32 of glass fibers saturated with a primary saturant 36 and coated with a higher molecular weight polymer topcoat 38.

Referring now to FIG. 2, another preferred embodiment shows the member 30 having a plurality of strand bundles 34 replacing the individual filaments 32. Also, FIG. 3 depicts the member 30 as having a combination of both filaments 32 and bundles 34. Again, in both FIGS. 2 and 3, the fibers that comprise the filaments 32 and/or bundles are saturated with the primary saturant 36 and coated with the topcoat 38.

The filaments 32 and bundles 34 are preferably glass fibers such as E-type glass fibers or ECR-type glass fibers such as Advantex® type glass fibers, both available from Owens Corning. These glass fibers are preferably sized with one of Owens Corning's sizing compositions prior to introduction within the member 30. Preferably Owens Corning sizing 158B, 111A or 366 is used; however, other epoxy/silane, vinylester, polyester, or starch/oil type sizings available from many manufacturers may also be used. The filaments 32 are preferably filamentized strands and are approximately 11-26 microns in diameter. The bundles 34 preferably comprise filaments of approximately 13 microns in diameter, with approximately 1000-2000 filaments per bundle 34 and have a linear density of approximately 200-4800 grams/kilometer.

The saturant 36 fills in the interstices between the strands 32 and/or bundles 34 and comprises about 0.1-35 percent, and more preferably about 15 percent, of the total weight of the member 30. The saturant 36 also fills the voids within the filaments 32 and/or bundles 34 caused by abrasions and or defects in the manufacturing process. In this way, the saturant 36 functions to lower the amount of air that is typically trapped between the filaments 32 and bundles. The saturant also lowers the amount of air that may be trapped within the bundles 34. The saturant 36 also prevents filament 32 deficiencies such as fiber-fiber abrasion, water penetration, and can increase the strength of the filaments 32. In these ways, the saturant 36 increases the strength of the member 30.

Preferably, the saturant 36 comprises a low molecular weight mineral wax having melting points under approximately 300 degrees Celsius, preferably less than 150 degrees Celsius and most preferably between about 100 and about 120 degrees Celsius and melt viscosities of less than approximately 1000 centipoise (cps), preferably less than 500 centipoise, that allow easy saturation into the fiber strands 32 or bundle 34. One preferable mineral wax is a microcrystalline wax such as Witco Chemical's Multiwax, which has a melting point of approximately 70-80 degrees Celsius (160-170 degrees Fahrenheit) and a melt viscosity of approximately 50-100 cps. Other examples of mineral waxes that may also be used include polyalphaolefin waxes, such as Baker Petrolite Vybar 260, and polyethylene waxes, such as Baker Petrolite Polywax 100. Additionally, modified polyethylenes and polypropylenes may also be used, such as Eastman Chemicals Epolene E-15 and E-43 oxidized polyethylene or Epolene G-3015 maleated polypropylene.

The high molecular weight polymer topcoat 38 surrounds the saturant 36, but does not penetrate within the saturant 36 to the filaments 32 and bundle 34. The topcoat 38 comprises between about 0.1 to about 35 percent, preferably between about 5 to about 20 percent and more preferably between about 10 to about 15 percent, of the total weight of the member 30. The topcoat 38 is tough, but flexible, and gives the member 30 its mechanical properties. The topcoat 38 is a higher modulus coating that changes the characteristics of the member 30. The topcoat 28 offers polyethylene adhesion and stiffen the member 30.

Table 1 shows the polyethylene adhesion of individual glass strands

TABLE 1

Polyethylene Adhesion Individual Strand Pull-Outs (lbf/0.5 in)

| | Wax Only | Wax + EAA Topcoat | DHM 712 Only | DHM 712 + EAA Topcoat | DHM 712/ EAA 70:30 Blend |
|---|---|---|---|---|---|
| 1 | 21.9 | 54.9 | 24.7 | 58.9 | 65.5 |
| 2 | 31.5 | 56.0 | 32.3 | 60.5 | 19.1 |
| 3 | 33.1 | 70.5 | 41.3 | 51.5 | 62.3 |
| 4 | 32.5 | 63.1 | 52.8 | 50.9 | 53.1 |
| 5 | 38.8 | 64.6 | 40.3 | 70.1 | 13.7 |
| 6 | 27.1 | 55.8 | 39.1 | 48.4 | 85.6 |
| 7 | 28.1 | 74.1 | 49.3 | 48.2 | 32.9 |
| 8 | 14.4 | 61.1 | 21.4 | 68.6 | 40.9 |
| 9 | 29.3 | 91.5 | 32.5 | 66.1 | 41.5 |
| 10 | 18.1 | 68.1 | 37.4 | 61.0 | 70.8 |
| 11 | 27.7 | 46.6 | 43.1 | 61.3 | 70.5 |
| 12 | 26.9 | 68.3 | 32.9 | 68.2 | 28.7 |
| 13 | 22.5 | 68.6 | 39.5 | 61.8 | 75.0 |
| 14 | 26.6 | 64.5 | 31.8 | 57.2 | 74.8 |

TABLE 1-continued

Polyethylene Adhesion Individual Strand Pull-Outs (lbf/0.5 in)

| | Wax Only | Wax + EAA Topcoat | DHM 712 Only | DHM 712 + EAA Topcoat | DHM 712/ EAA 70:30 Blend |
|---|---|---|---|---|---|
| Average | 27.0 | 64.8 | 37.0 | 59.5 | 52.5 |
| Std. Dev. | 6.3 | 10.6 | 8.6 | 7.4 | 23.0 |
| C.I. | 4 | 7 | 6 | 5 | 16 |
| Upper | 31 | 72 | 43 | 65 | 68 |
| Lower | 23 | 58 | 31 | 54 | 37 |

Test was strand pull out from polyethylene plaques. Raw data recorded in pounds of force per 0.5 inch imbedded strand.
Polyethylene was cable jacketing grade, black compounded.
Pulls done at room temperature.
Test method used: ASTM D1871 Adhesion of Glass to PVC; Test Method #53.

according to ASTM D1871, Test Method #53.

If water swellable topcoats are used, the member 30 could provide additional water protection capabilities.

One preferred topcoat 38 is an ethylene acrylic acid (EAA) polymer such as Dow Chemical's Primacor 5986 or 59901 ethylene acrylic acid resin or ethylene methacrylic acid (EMAA) such as Nucrel® polymer manufactured by duPont de Nemours and Company, which are both useful if adhesion to a polyethylene jacket is required. Other polymers that may comprise the topcoat 38 include polyethylene (PE) or polypropylene (PP) polymers, or copolymers of PE and PP, available from manufacturers such as Dow Chemical, Shell, and Basell. Still further preferable topcoats 38 include ethylene vinyl acetate (EVA) copolymers, styrene-butadiene-styrene (SBS), polybutadiene terephthlate polyether glycol (PBT-PEG), polyamide or many other polyolefins and thermoplastic elastomers available from manufacturers such as Henkel, GLS and E. I. Du Pont de Nemours. Of course, as one skilled in the art would appreciate, the ultimate choice of topcoats 38 is dependent upon the end use of the communications cable having the reinforcement member 30.

Figure 4:
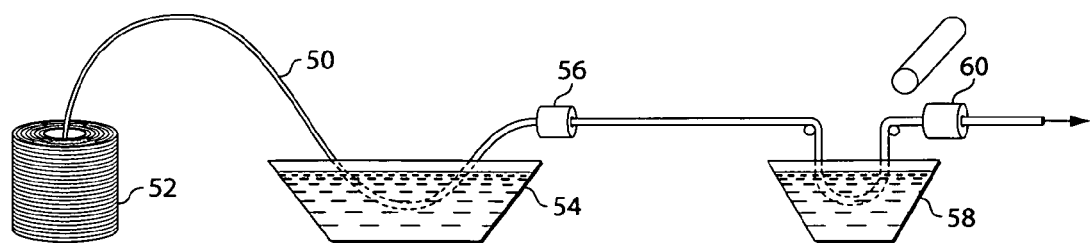
FIG. 4 illustrates an assembly line used for making the flexible reinforcement member according to FIGS. 1-3.

FIG. 4 illustrates the process for making the members 30 of FIGS. 1-3. The process begins by unrolling the fibers 50 from a reel 52. The fibers 50 represent filaments 32, bundles 34, or a combination of filaments 32 and bundles as depicted in FIGS. 1-3. The fibers 50 are introduced to an application device 54, here a heated immersion bath 54 that holds the saturant 36. The bath 54 is maintained between approximately 90-100 degrees Celsius (200-210 degrees Fahrenheit) such that the primary saturant 36 has a viscosity of approximately 50-100 cps.

The coated fibers 50 exit the bath 54 and are introduced to a stripper die 56. In the embodiment shown in FIG. 5, the stripper die 56 has an internal diameter of approximately 0.84 millimeters (0.033 inches) to strip back the excess saturant 36 and to help impregnate the fibers 50. The coated fibers 56 are then introduced to an applicator 58 containing the topcoat 38. Preferably, the applicator 58, as shown here, is a Nordson hot melt applicator 58. The topcoat 38 enters the applicator 58 through an orifice (not shown) For Dow Primacor 59901, which has a melt point index of 1300 grams per 10 minutes, the material is heated to approximately 125 degrees Celsius (257 degrees Fahrenheit) as it enters the fixed orifice through a thick hose (not shown) and applied to the fibers 50. The fibers 50 exit the applicator 58 and enter a second stripper die 60 having an inner diameter of approximately 1.12 millimeters (0.044 inches). The second stripper die 60 removes excess topcoat 38 and smoothes the outer surface of the topcoat 38. The topcoat is then cooled to form the reinforcement member 30.

In an alternative embodiment not shown, an extruder using a crosshead die or similar applicator apparatus may be used in place of the applicator 58 to introduce the topcoat 38 to the coated fibers 50.

Figure 5:
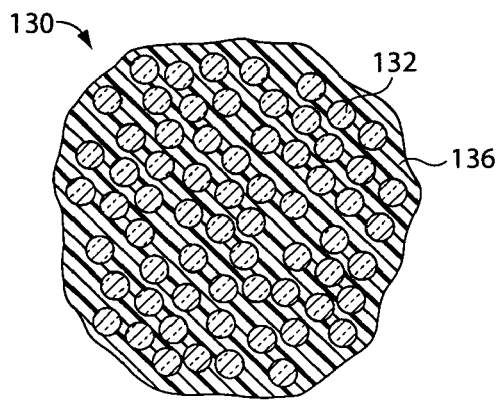
FIG. 5 is a cross-sectional view of a flexible reinforcement member according to a preferred embodiment of the present invention.
Figure 6:
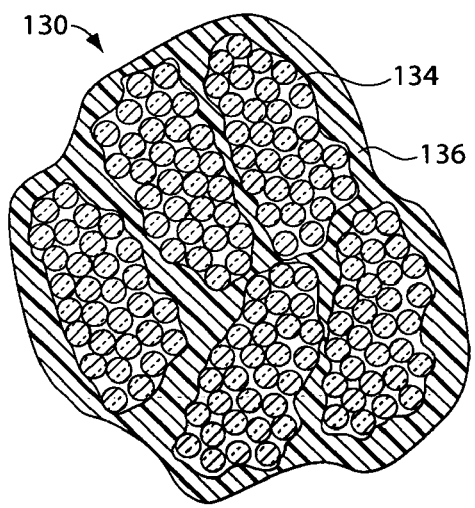
FIG. 6 is a cross-sectional view of a flexible reinforcement member according to a preferred embodiment of the present invention.
Figure 7:
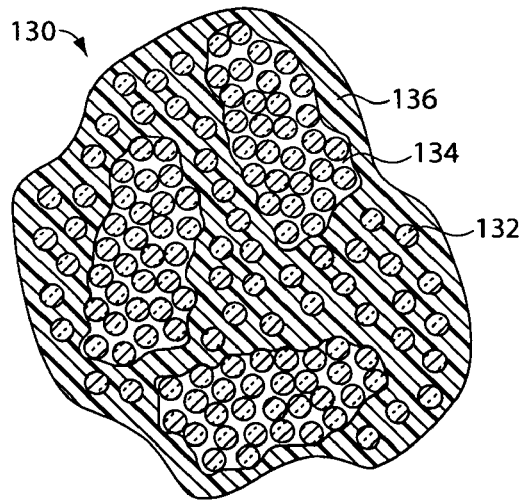
FIG. 7 is a cross-sectional view of a flexible reinforcement member according to a preferred embodiment of the present invention.

While the members 30 as shown in FIGS. 1-4 above exhibit excellent mechanical properties, the application of the topcoat 38 to the fibers 50 can be difficult due to the high viscosity nature of the topcoat 38 material. FIGS. 5-7 illustrates an alternative method for making a flexible reinforcement member 130 that address these issues. The embodiments utilize the same strand and/or bundle design as shown FIGS. 1-3, but utilize a different low molecular weight primary saturant 136 to achieve the desired mechanical properties of the members 130 without the need for the topcoat.

Thus, as shown in FIG. 5, the member 130 is comprised of a strand of a plurality of single filaments 132 of glass fibers, while FIG. 6 utilizes bundles 134, and FIG. 7 utilizes combinations of filaments 132 and bundles 134 saturated with a low molecular weight primary saturant 136.

Here, the primary saturant 136 is a 90/10 to 10/90 by weight blend, and more preferably a 50/50 by weight blend, of a microcrystalline wax and styrene butadiene rubber ("SBR") compound. As above, one preferred microcrystalline wax that may be used is Witco Chemical's Multiwax. One preferred SBR compound used in the saturant 136 is DHM 712, available from DHM Adhesives, Inc. The DHM 712 has a softening point of approximately 95 degrees Celsius (203 degrees Fahrenheit) and a viscosity of 2250 cps at 177 degrees Celsius (350 degrees Fahrenheit). Blends of other high and low viscosity thermoplastic polymers or highly plasticized polymers can be similarly used, as long as the primary saturant material has less than 500 cps melt viscosity.

Figure 8:
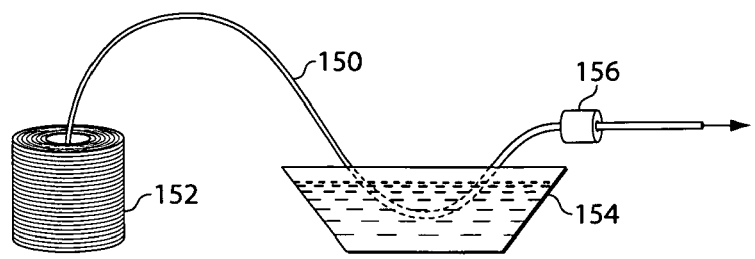
FIG. 8 illustrates an assembly line used for making the flexible reinforcement member according to FIGS. 5-7.

FIG. 8 illustrates the process for making the members 30 of FIGS. 5-7. The process begins by unrolling the fibers 150 from a reel 152. The fibers 150 represent strands 132, bundles 134, or a combination of strands 132 and bundles 134 as depicted in FIGS. 5-7. The fibers 150 are introduced to a first application device 154, here a heated immersion bath 154, that holds the saturant 136. The bath 154 is maintained between approximately 120-150 degrees Celsius (250-300 degrees Fahrenheit) such that the primary saturant 136 has a viscosity of approximately 50-100 cps. The coated fibers 150 exit the bath 154 and are introduced to a stripper die 156. In the embodiment shown in FIG. 8, the stripper die 156 has an internal diameter of approximately 0.84 millimeters (0.033 inches) to strip back the excess saturant 136 and to help impregnate the fibers 150. The coated fibers 150 are then cooled to form the reinforcement member 130 having a diameter of between approximately 0.5 and 1.0 mm.

The flexible reinforcement members 30, 130 of FIGS. 1-3 and 5-7 are then available to be inserted into a communications cable by known techniques. FIGS. 9-20 illustrate many of the possible types of communications cables utilizing these flexible reinforcement members 30, 130. Each is described below.

FIGS. 9-14 illustrate a 48-fiber "Dry Cable" structure 300 according to six preferred embodiments of the present invention. Each of these structures 300 having the flexible reinforcement member 30 or 130 offers increased strength and flexibility as compared to structures with traditional reinforcement members.

Figure 9:
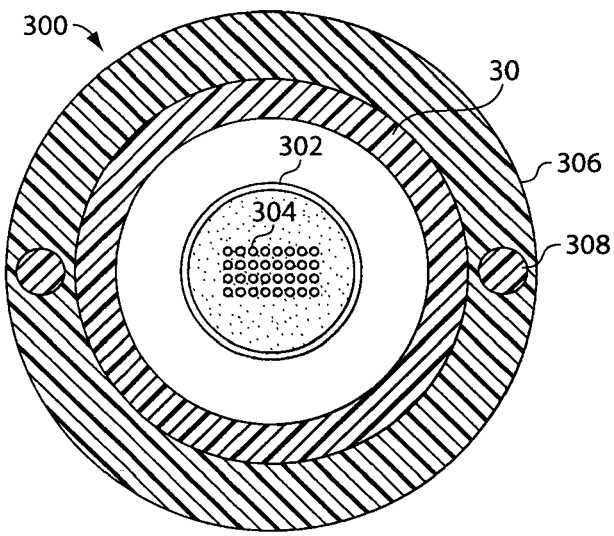
FIGS. 9-20 illustrate communications cables having the flexible reinforcement members of FIGS. 1-3 and FIGS. 5-7.

As shown in FIG. 9, the structure 300 comprises a gel-filled loose tube 302 having an optical fiber ribbon 304. The loose tube 302 is surrounded by the flexible reinforcement member 30 and covered with a high density polyethylene ("HDPE") sheath 306. Also shown is a strength member 308, which could in this case be made by either the present invention or by conventional thermosetting processes.

Figure 10:
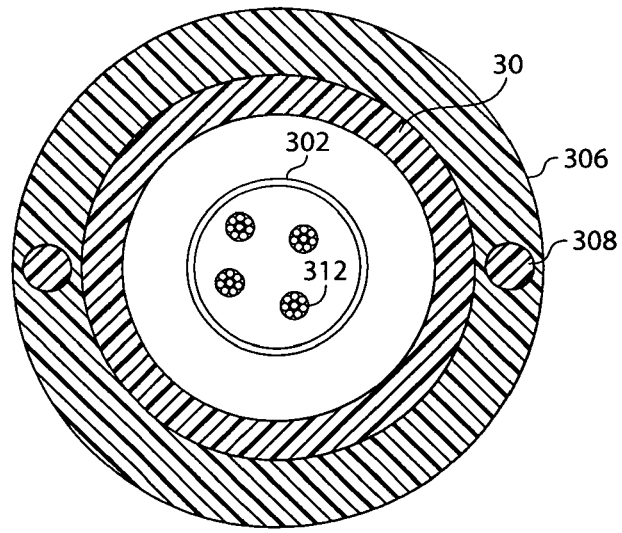

In FIG. 10, the optical fiber ribbon 304 is replaced with a plurality of optical fiber bundles 312 contained within the gel filled loose tube 302.

Figure 11:
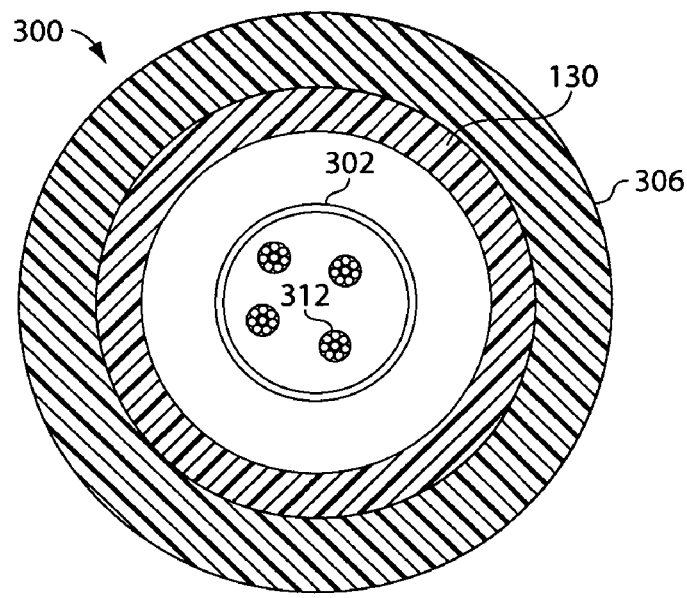
Figure 12:
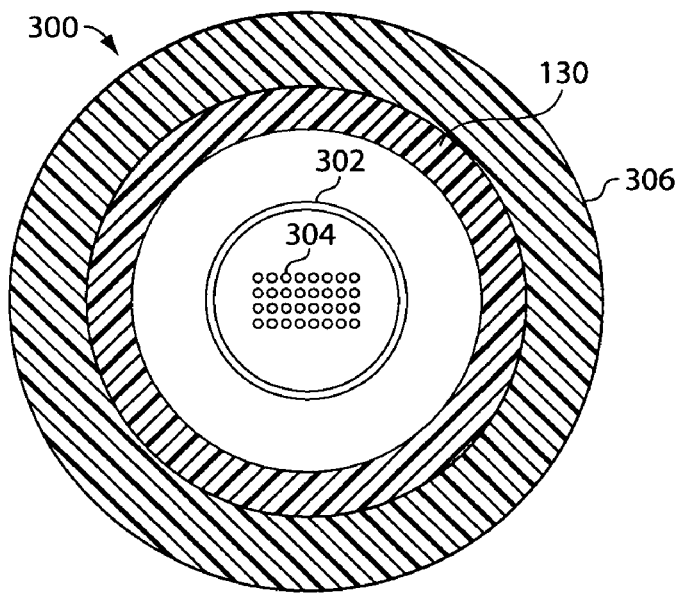

In FIGS. 11 and 12, the flexible reinforcement member 130 replaces the flexible reinforcement member 30 of FIGS. 10 and 9, respectively. These embodiments also do not require the rigid strength members 308.

Figure 13:
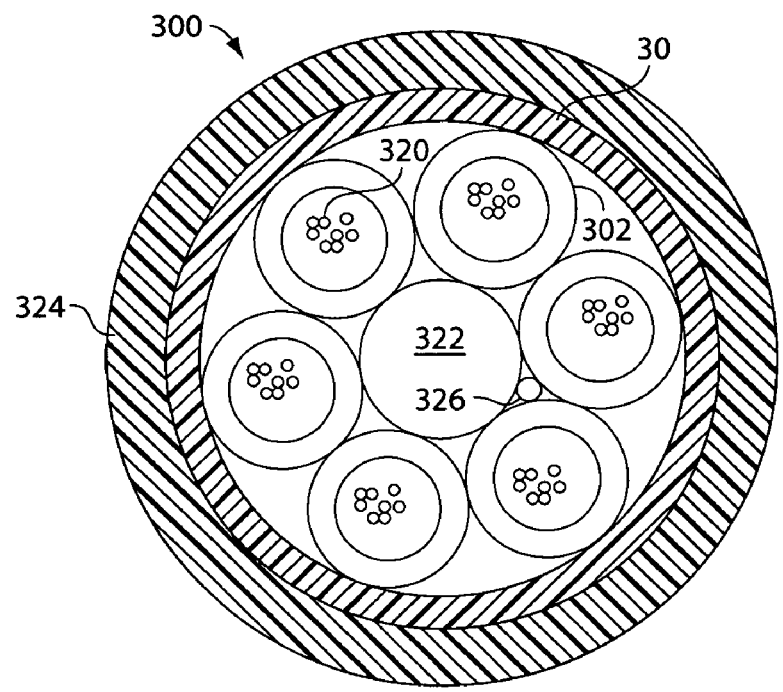

Referring to FIG. 13, a plurality of gel filled loose tubes 302 each filled with individual optical fibers 320 is shown surrounding a rigid central strength member 322. The flexible reinforcement member 30 then surrounds the loose tubes and is covered with an HDPE sheath 324. Also shown is a water swellable thread 326.

Figure 14:
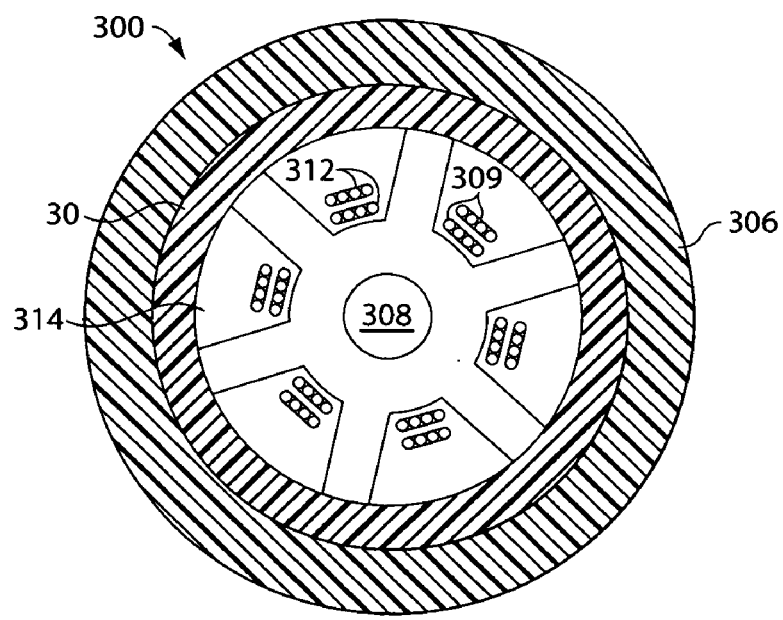

In FIG. 14, a water blocking tape 314 is introduced between the flexible reinforcement member 30 and the optical fiber bundles 312 as an additional moisture barrier layer. Here, the rigid strength member 308 is centrally located and within a slotted core structure containing the optical fiber bundles 312 within slots 309. The strength member is not within the HDPE sheath 306 as in FIGS. 9-12.

FIGS. 15-18 illustrate a 48-fiber "Rodent Resistant Cable" structure 400 according to five preferred embodiments of the present invention. Each of these structures 400 having the flexible reinforcement member 30 or 130 offers increased strength and flexibility as compared to structures with traditional reinforcement members.

Figure 15:
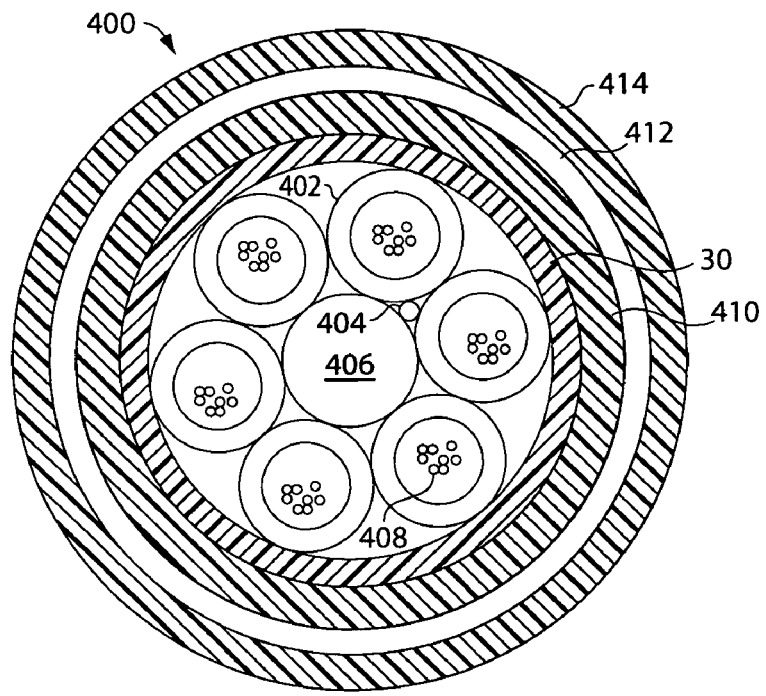

Referring now to FIG. 15, the structure 400 comprises a gel filled loose tube 402 and a water swellable thread 404 surrounding a central strength member 406. Each loose tube 402 has a plurality of loose optical fibers 408 and is surrounded by the flexible reinforcement member 30, an inner HDPE sheath 410, a layer of glass tape reinforcement 412, and an outer HDPE sheath 414.

Figure 16:
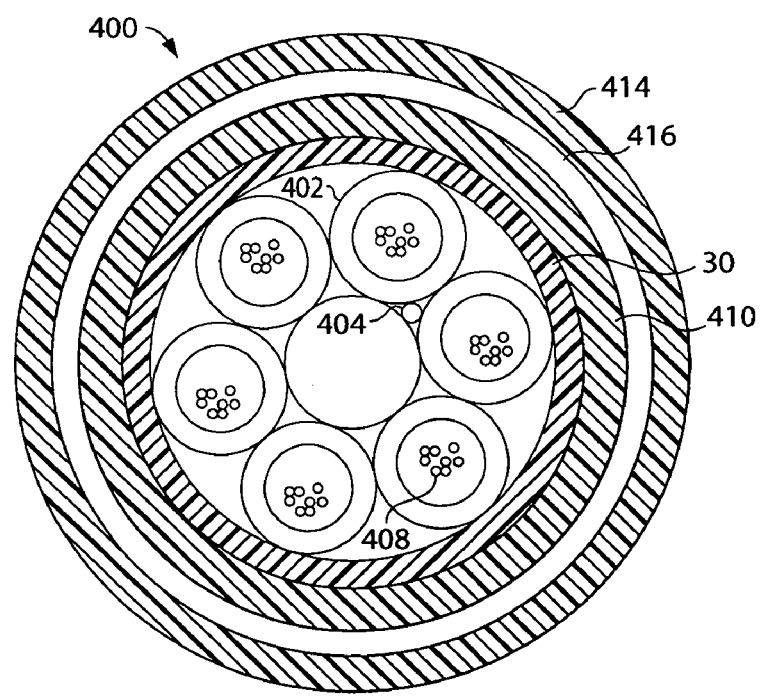
Figure 17:
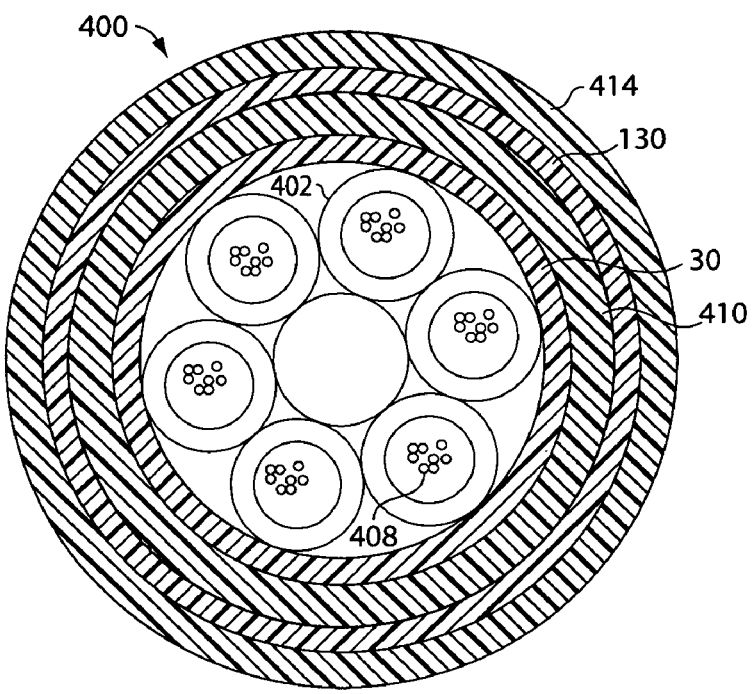

In FIG. 16, a layer of glass flex reinforcement 416 replaces the glass tape reinforcement 412. In FIG. 17, a layer of flexible glass reinforcement 130 replaces the glass tape reinforcement 412.

Figure 18:
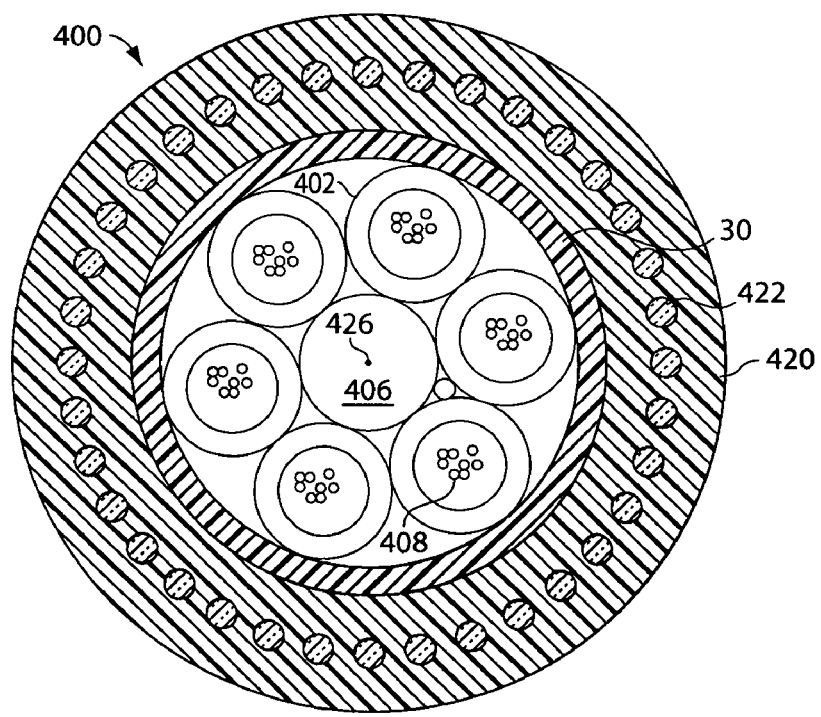

Referring now to FIG. 18, the loose tubes 402 are first surrounded by the flexible reinforcement member 30 which is surrounded by an outer HDPE sheath 420 having a plurality of fiber glass reinforcing rods 422. The rods 422, typically about 1.3 mm in diameter, are preferably evenly spaced within the HDPE sheath 420 and equidistant from a point 426 defining the center of the central strength member 406.

Figure 19:
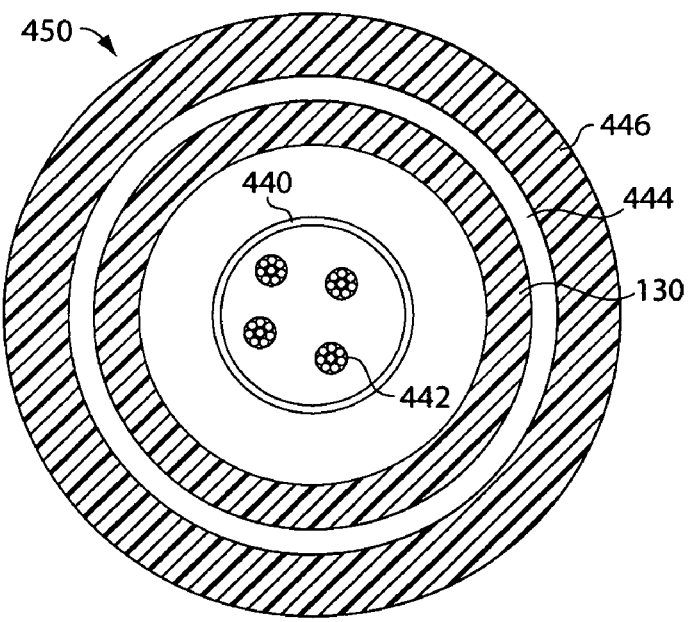

In FIG. 19, a buffer tube cable 450 according to another preferred embodiment comprises a gel filled loose tube 440 having a plurality of optical fiber bundles 442 that is surrounded by a flexible reinforcement member 130. The member 130 is then surrounded by a 0.4 mm thick layer of Nylon 12 sheath 444 and an outer HDPE sheath 446.

Figure 20:
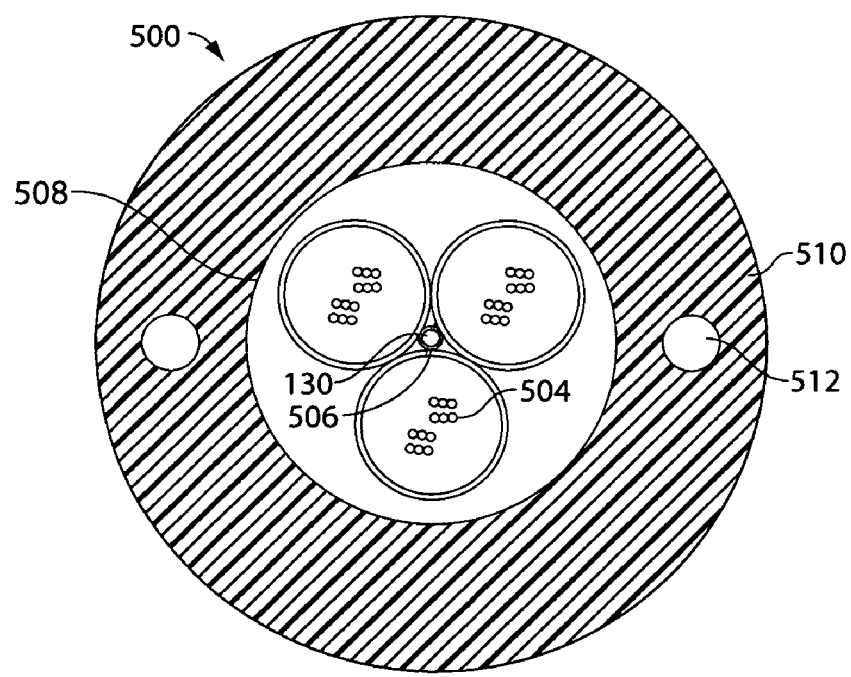

Referring to FIG. 20, a buffer tube cable 500 according to another preferred embodiment is shown as having a plurality of buffer tubes 502 each having 12 optical fibers 504 surrounding a flexible reinforcement member 130 having a waterblocking coating 506. A layer of waterblocking tape 508 surrounds the buffer tubes 502 which is surrounded by an outer HDPE sheath 510 having a plurality of rigid rod strength members 512.

The embodiments as shown in FIGS. 9-20 illustrate the wide range of potential embodiments using the flexible reinforcement members 30, 130 of FIGS. 1-3 and 5-7 for use in optical fiber type communication cable systems. Of course, these members 30, 130 could be used in other systems as well, including, for example, copper communication cable systems.

The present invention offers many advantages over the prior art. Because the cable structures 300, 400, 500 having these reinforcement members 30, 130 are lighter than communications cables having traditional glass reinforcement members, installation of these cables within ducts in underground cable systems using known installation techniques such as blowing-in installation is possible, in which compressed air is used to install the cables within underground ducts. As one of skill in the art appreciates, the use of blowing-in installation is a cheaper, less time consuming, and gentler process for installing communication cables versus traditional installation techniques that utilize a winch and gripper to physically pull the cable through and into a duct.

Further, because these structures 300, 400, 500 are more flexible than communication cable structures requiring glass pultruded rods for strength, these structures 300, 400, 500 are more readily inserted around bends or corners in the ducts. Also, because the reinforcement members 30, 130 are stronger and have more rigidity or antibuckling properties than traditional flexible reinforcement members, attenuation of the optical fibers is prevented due cable shrinkage or expansion during daily or seasonal thermal cycling. Bunching or jamming of the communication cables during installation is also prevented due to the ability to engineer the right amount of cable rigidity to prevent these installation problems.

Figure 21:
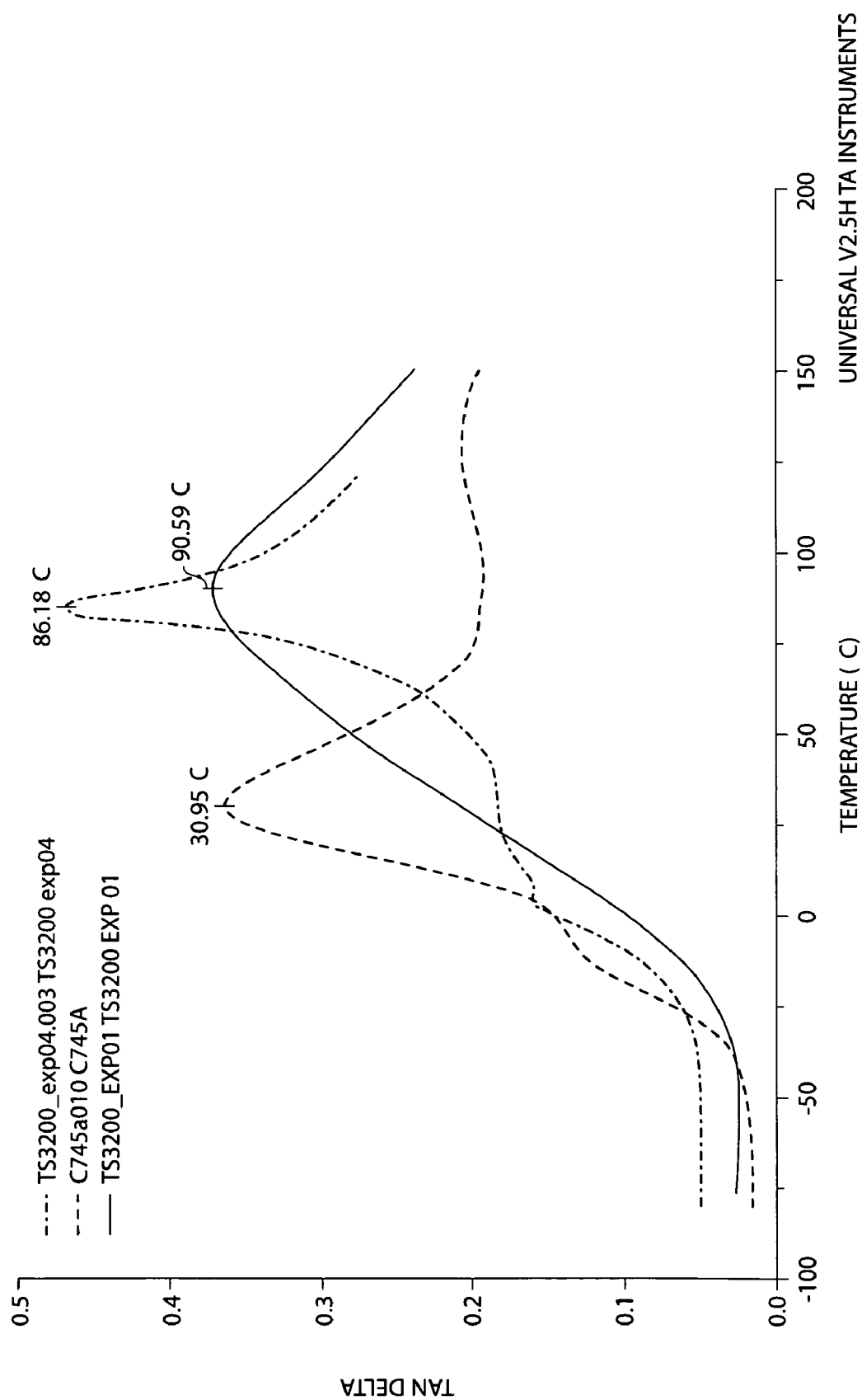
FIG. 21 illustrates a graph comparing glass transition temperatures of traditional coated reinforcements with flexible coated reinforcements of the present invention.

FIG. 21 is a comparative graph depicting glass transition temperatures of traditional coated reinforcements and the flexible coated reinforcements of the present invention. In particular, the glass transition temperature of traditional glass fibers coated with latex and acrylic wax is shown in comparison to glass transition temperatures of glass fibers coated with a low molecular weight mineral wax and an ethylene acrylic acid (EAA) topcoat and glass fibers coated with a low molecular weight mineral wax and ethylene vinyl acetate (EVA) topcoat.

As can be seen in FIG. 21, the standard thermoset CR745A flexible reinforcement has a glass transition temperature, Tg, of 30.96°. Tg is the temperature where an amorphous polymer transitions from a brittle, vitreous material to a more pliable, more flexible, softer material. In contrast to the standard reinforcement, the two thermoplastic-coated reinforcements have Tg's that are about 86° and 91° C., respectively. The higher Tg allows for a processable and more flexible reinforcement at the cable's upper range of the usual operating range of −40° to +80° C. In contrast the polymer transitions to a stiff matrix at the lower temperature range. Being able to control Tg by selective choice of thermoplastic materials or blends of such materials and appropriate modifiers allows for the reinforcement to be customized to precisely meet the cable's performance requirements. As the reinforcement transitions from a flexible to a rigid member, the cable is protected from shrinkage from the polyethylene or other jacketing material as the cable experiences temperature cycles. Uncontrolled shrinkage can cause optical fiber signal attenuation or catastrophic optical fiber breakage.

In an alternative embodiment, as illustrated in FIGS. 22-24 and 26-28, the fibers or bundles may be coated only with topcoat 38. This reduces manufacturing costs while still providing the reinforcement member 30 with strong, flexible properties. In addition, the fiber or bundle is also softer and thus more conformable as it is wrapped around the cable core during cable manufacturing.

Figure 22:
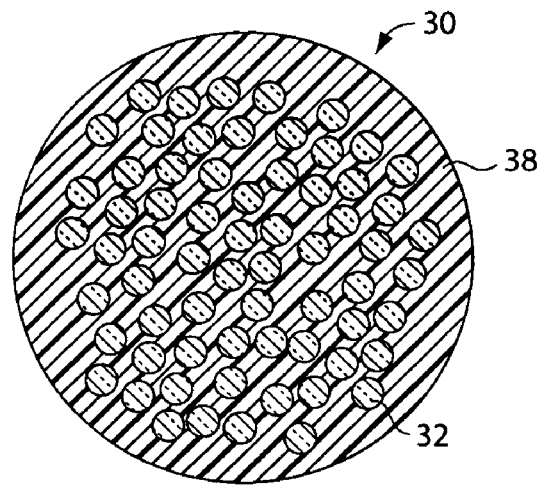
FIG. 22 is a cross-sectional view of a flexible reinforcement member according to a preferred embodiment of the present invention.

FIG. 22 illustrates a cross-sectional view of the flexible reinforcement member 30 according to a preferred embodiment of the present invention. The member 30 is comprised of a strand having a plurality of single filaments 32 of glass fibers coated with a higher molecular weight polymer topcoat 38.

Figure 23:
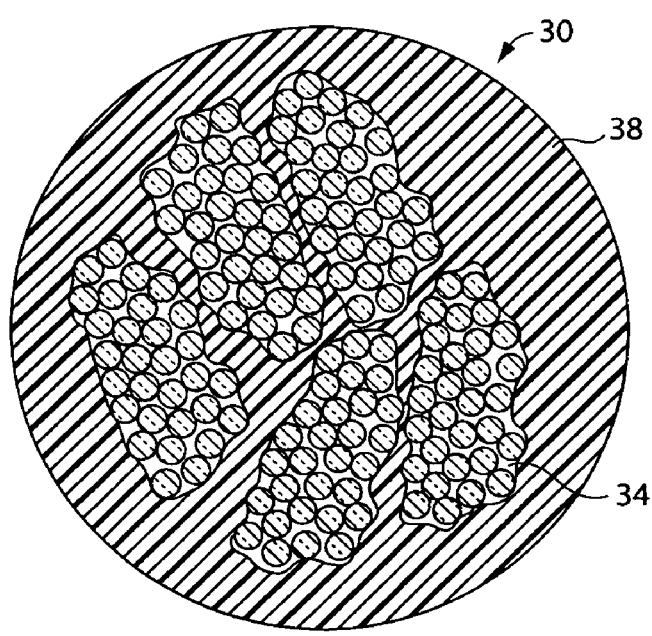
FIG. 23 is a cross-sectional view of a flexible reinforcement member according to a preferred embodiment of the present invention.

Referring now to FIG. 23, another preferred embodiment shows the member 30 having a plurality of strand bundles 34 replacing the individual filaments 32. Also, FIG. 3 depicts the member 30 as having a combination of both filaments 32 and bundles 34. Again, in both FIGS. 2 and 3, the fibers that comprise the filaments 32 and/or bundles are coated with the topcoat 38.

The high molecular weight polymer topcoats used to coat the fiber or bundle are typically highly viscous and have difficulty penetrating the interstitial spaces between the fibers. However, some penetration will likely occur, typically in the range of about 10 to about 50 percent of the total weight of the member 30.

The topcoat 38 comprises between about 0.1 to about 35 percent, preferably between about 5 to about 20 percent and more preferably between about 10 to about 15 percent, of the total weight of the member 30.

As stated above, preferable topcoats include ethylene acrylic acid (EAA), ethylene methacrylic acid (EMAA) and ethylene vinyl acetate (EVA). Other topcoats which may be used include polyethylenes, polypropylenes, polyethylene copolymers, styrene-butadiene-styrenes, thermoplastics with elastomeric properties such as acrylonitrile butadiene-styrenes, polybutadiene terephthlate polyether glycols, polyamides, polyolefins and thermoplastic elastomers, thermoplastic polyesters, thermoplastic olefins, thermoplastic urethanes, fluoropolymers, polyvinyl chloride compounds and blends thereof.

Higher modulus engineering thermoplastics which have mechanical, chemical and thermal properties, maintain dimensional stability, and are suitable for use under conditions of high impact, heat or moisture such as, acetals, polycarbonates, polyphenylene sulfides, polysulfones, modified polyphenylene oxides, polyimides, poly-amide-imides and blends thereof. These materials will provide rigid character to the reinforcement member 30, which is better suited for resisting thermal contraction of the communication cable during temperature cycling.

Water swellable superabsorbent polymer topcoats may also be used such as Cabloc 80HS or Cabloc 40HS manufactured by Stockhausen (Greensboro, N.C.), Technomelt 80-8254 (unfilled ethylene vinyl acetate; EVA) manufactured by Henkel (Elgin, Ill.), Primacor 59801 (ethylene acrylic acid; EAA) manufactured by The Dow Chemical Company (Midland, Mich.), Multiwax 180M (microcrystalline wax) manufactured by Witco Corporation (Petrolia, Pa.), and Macromelt Q4411-221 (EVA containing a superabsorbent polymer pre-compounded) manufactured by Henkel (Elgin, Ill.).

Figure 24:
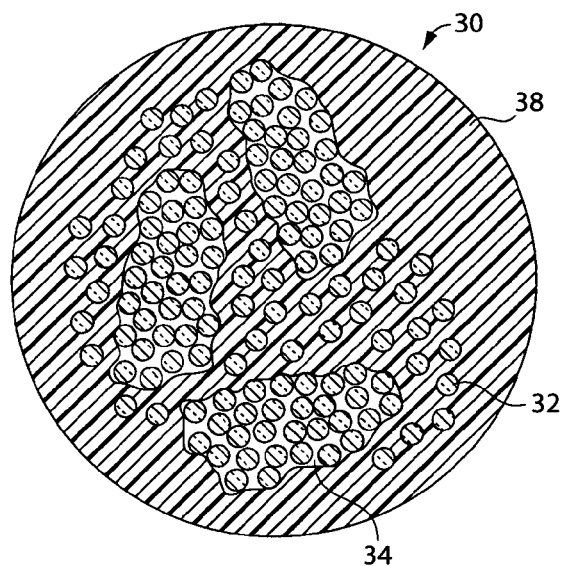
FIG. 24 is a cross-sectional view of a flexible reinforcement member according to a preferred embodiment of the present invention.
Figure 25:
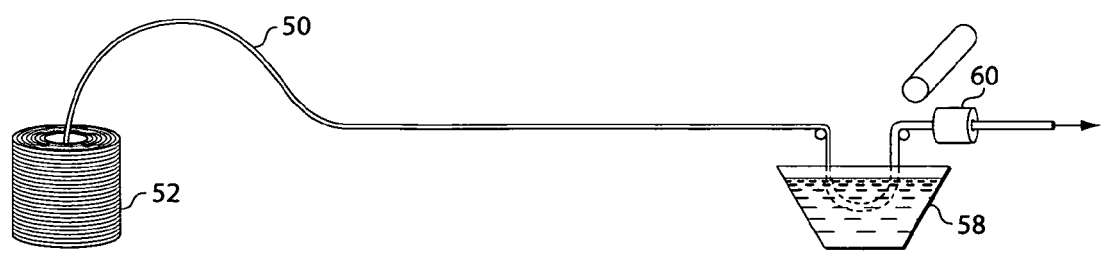
FIG. 25 illustrates an assembly line used for making the flexible reinforcement member according to FIGS. 22-24.

The topcoat may be applied using a variety of application techniques. FIG. 25 illustrates the process for making the members 30 of FIGS. 22-24. The process begins by unrolling the fibers 50 from a reel 52. The fibers 50 represent filaments 32, bundles 34, or a combination of filaments 32 and bundles as depicted in FIGS. 22-24. The fibers 50 are introduced to an applicator 58 containing the topcoat 38. Preferably, the applicator 58, as shown here, is a Nordson hot melt applicator 58. The topcoat 38 enters the applicator 58 through an orifice (not shown) For Dow Primacor 59901, which has a melt point index of 1300 grams per 10 minutes, the material is heated to approximately 125 degrees Celsius (257 degrees Fahrenheit) as it enters the fixed orifice through a thick hose (not shown)

and applied to the fibers 50. The fibers 50 exit the applicator 58 and enter a second stripper die 60 having an inner diameter of approximately 1.12 millimeters (0.044 inches). The stripper die 60 removes excess topcoat 38 and smoothes the outer surface of the topcoat 38. The topcoat is then cooled to form the reinforcement member 30.

Figure 29:
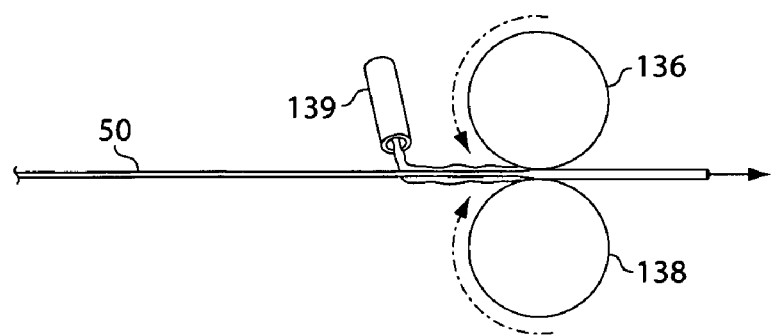
FIG. 29 illustrates a method of coating high modulus fibers to form a reinforcement member shown in FIGS. 22-24 and FIGS. 26-28.

In another embodiment, shown in FIG. 29, the fiber 50 is coated by counter rotating rolls 136, 138. Extruder 139 introduces topcoat 38 and the fiber 50 is then pulled between counter rotating rolls 136, 138. Roll 136 turns in a counter-clockwise direction and roll 138 turns in a clockwise direction (see arrows). The counter rotating rolls 136, 138 provide a uniform coating of topcoat 38 to the fiber 50. The counter rotating rolls 136, 138 provide a uniform coating of topcoat 38 to the fiber 50. The counter rotating roll helps the high viscosity topcoat to penetrate the interstitial spaces between the reinforcement filaments by applying pressure to the topcoat forcing it to impregnate the fibrous bundle of the reinforcement. Although the use of stripper dies can be used in conjunction with these two rolls, using rolls in this manner does not require the use of stripper dies. The rolls are maintained with a precise gap between them that, in effect, meters the amount of topcoat being applied to the strand, as well as removes the excess topcoat being applied. The topcoat is then cooled to form the reinforcement member 30.

Figure 30:
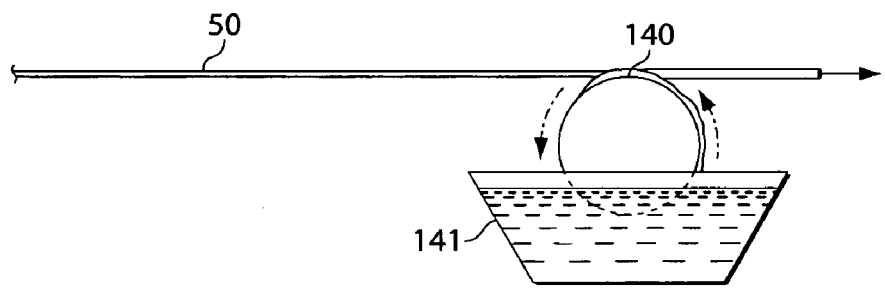
FIG. 30 illustrates another method of coating high modulus fibers to form a reinforcement member shown in FIGS. 22-24 and 26-28.

In another embodiment, illustrated in FIG. 30, the fiber 50 is coated by a single counter-rotating roll 140. Roll 140 is positioned in topcoat reservoir 141 and turns in a counter-clockwise direction. The roll 140 picks up topcoat from the reservoir 141 as it turns and coats the fiber 50 as the fiber 50 is pulled over the roller. The use of a roll in a counter rotating motion helps to open the fiber bundle and force the topcoat to penetrate the fiber. In this method, stripper dies would be useful to provide a means of removing the excess coating. However, stripper dies may not be necessary if the roll speed and topcoat film thickness are precisely controlled to, in effect, add a metered amount of topcoat to the strand. As above, the topcoat is cooled to form reinforcement member 30.

Figure 31:
FIG. 31 illustrates a further method of coating high modulus fibers to form a reinforcement member shown in FIGS. 22-24 and 26-28.

As shown in FIG. 31, an extruder 142 using a crosshead die 143 is used in place of the counter rotating rolls or single counter rotating roll to introduce the topcoat 38 to the fibers 50.

Figure 26:
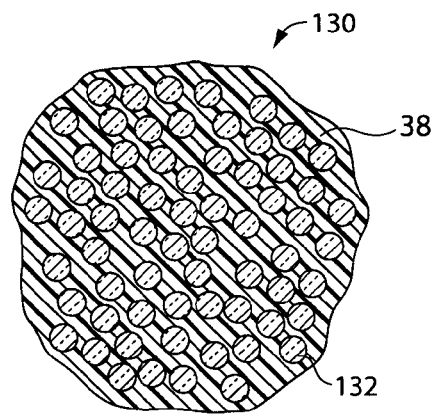
FIG. 26 is a cross-sectional view of a flexible reinforcement member according to a preferred embodiment of the present invention.
Figure 27:
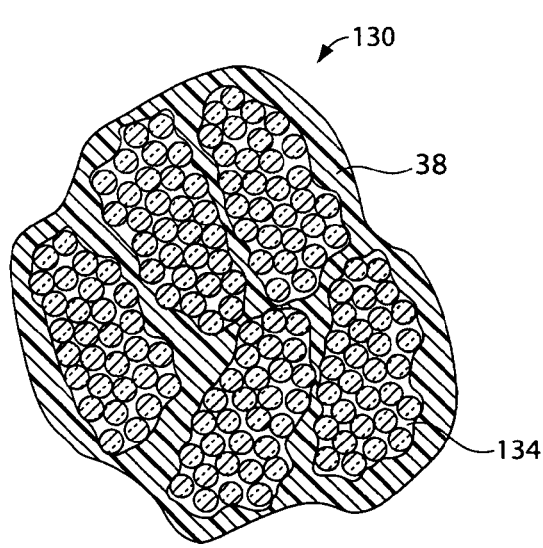
FIG. 27 is a cross-sectional view of a flexible reinforcement member according to a preferred embodiment of the present invention.
Figure 28:
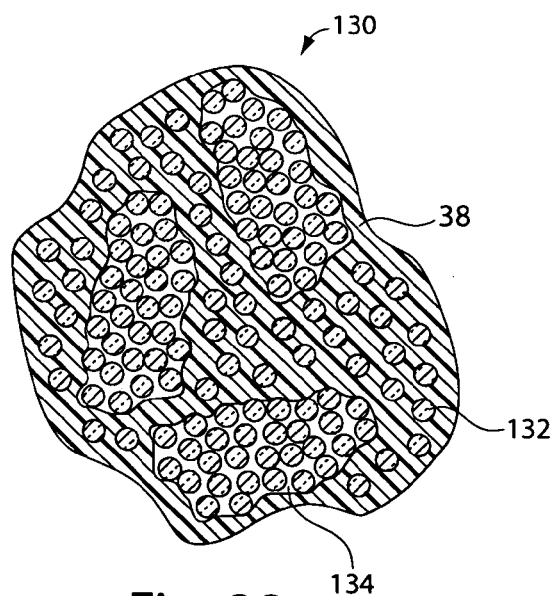
FIG. 28 is a cross-sectional view of a flexible reinforcement member according to a preferred embodiment of the present invention.

Referring to FIGS. 26-28, each of the embodiments shown are similar to those embodiments shown in FIGS. 22-24 and may include a plurality of single filaments 132 of high modulus fibers, e.g., glass fibers, as described above, and/or a plurality of strand bundles 134, as described above, coated with a high molecular weight polymer topcoat 135, as described above, using any of the methods/processes described with reference to and illustrated in FIG. 25 and FIGS. 29-31.

The fiber to be coated with topcoat may be an uncoated fiber, i.e., unsized fibers such as uncoated aramid, PBO, spectra or glass fibers that have been "undersized" and dried, heat cleaned or solvent washed, or may be precoated in an offline process. Precoated fibers may be coated with polymer coatings including thermoplastic coatings, sizing, finishes, waxes, curing agents, and conventional thermosetting resins including, but not limited to, epoxies, polyimide, vinyl esters and acrylics. The primary saturant 36, as mentioned above, may also be applied in the offline process and then coated with the topcoat 38.

While the invention has been described in terms of preferred embodiments, it will be understood, of course, that the invention is not limited thereto since modifications may be made by those skilled in the art, particularly in light of the foregoing teachings.

What is claimed is:

1. A flexible reinforcement member for a communications cable comprising:
   a plurality of high modulus fibers; and
   a non-water based, water swellable superabsorbent polymer providing a high melt viscosity at temperatures between about 100° C. to about 150° C., the superabsorbent polymer surrounding said plurality of high modulus fibers and providing said plurality of high modulus fibers with a high modulus coating, such that, said reinforcement member is flexible, conformable, and soft, and provides adhesion properties, said flexible reinforcement member having an elongate structure and defining a cross-section, and said water swellable superabsorbent polymer comprising between about 0.1 to about 35 percent by weight of the total weight of said flexible reinforcement member, such that, said reinforcement member is lightweight.

2. The flexible reinforcement member of claim 1, wherein said plurality of high modulus fibers comprises a plurality of sized high modulus fibers selected from the group consisting of a plurality of at least one of sized aramid fibers and unsized aramid fibers, a plurality of at least one of sized poly(p-phenylene-2,6-benzobisoxazole) (PBO) fibers and unsized poly(p-phenylene-2,6-benzobisoxazole) (PBO) fibers, a plurality of at least one of sized carbon fibers and unsized carbon fibers, a plurality of at least one of sized high silica glass and unsized high silica glass, and a plurality of at least one of sized high tenacity, linearized polyethylene fiber and unsized high tenacity, linearized polyethylene fiber.

3. The flexible reinforcement member of claim 1, wherein said plurality of high modulus fibers comprises a plurality of glass fiber strands.

4. The flexible reinforcement member of claim 3, wherein said plurality of glass fiber strands comprises a plurality of glass fiber strands consisting of a plurality of sized or unsized E-type glass fiber strands and sized and unsized ECR-type glass fibers strands.

5. The flexible reinforcement member of claim 1, wherein said water swellable superabsorbent polymer comprises between about 5 to about 20 percent of the total weight of said flexible reinforcement member.

6. The flexible reinforcement member of claim 1, wherein said water swellable superabsorbent polymer comprises between about 10 to about 15 percent of the total weight of said flexible reinforcement member.

7. The flexible reinforcement member of claim 1, wherein said water swellable superabsorbent polymer is selected from the group consisting of unfilled ethylene vinyl acetate, ethylene acrylic acid, microcrystalline wax, ethylene vinyl acetate containing a superabsorbent polymer pre-compounded, and blends thereof.

8. A flexible reinforcement member for a communications cable comprising:
   a plurality of high modulus fibers; and
   a nonwater-based high molecular weight polymer providing a high melt viscosity at temperatures between about 100° C. to about 150° C., the high molecular weight polymer surrounding said plurality of high modulus fibers and providing said high modulus fibers with a high modulus coating, such that, said reinforcement member is flexible, conformable, and soft, and provides adhesion properties, said flexible reinforcement member having an elongate structure and defining a cross-section, and said high molecular weight polymer comprising between about 0.1 to about 35 percent by weight of the total weight of said flexible reinforcement member, such that, said reinforcement member is lightweight.

9. The flexible reinforcement member of claim 8, wherein said plurality of high modulus fibers comprises a plurality of sized high modulus fibers selected from the group consisting of a plurality of at least one of sized aramid fibers and unsized aramid fibers, a plurality of at least one of sized poly(p-phenylene-2,6-benzobisoxazole) (PBO) fibers and unsized poly(p-phenylene-2,6-benzobisoxazole) (PBO) fibers, a plurality of at least one of sized carbon fibers and unsized carbon fibers, a plurality of at least one of sized high silica glass and unsized high silica glass, and a plurality of at least one of sized high tenacity, linearized polyethylene fiber and unsized high tenacity, linearized polyethylene fiber.

10. The flexible reinforcement member of claim 8, wherein said plurality of high modulus fibers comprises a plurality of glass fiber strands.

11. The flexible reinforcement member of claim 10, wherein said plurality of glass fiber strands comprises a plurality of glass fiber strands consisting of a plurality of sized or unsized E-type glass fiber strands and sized and unsized ECR-type glass fibers strands.

12. The flexible reinforcement member of claim 8, wherein said high molecular weight polymer is selected from the group consisting of a high molecular weight polyethylene and polymers thereof, a high molecular weight polypropylene and polymers thereof, a high molecular weight ethylene acrylic acid, a high molecular weight polyethylene copolymer, a high molecular weight polypropylene copolymer, an ethylene vinyl acetate and polymers thereof, an ethylene methacrylic acid and polymers thereof, a styrene-butadiene-styrene, an acrylonitrile butadiene-styrene, a polybutadiene terephthlate polyether glycol, polyamides, polyolefins and thermoplastic elastomers, thermoplastic polyesters, thermoplastic olefins, thermoplastic urethanes, acetals, polycarbonates, polyphenylene sulfides, polysulfones, modified polyphenylene oxides, polyimides, poly-amide-imides and blends thereof.

13. The flexible reinforcement member of claim 12, wherein the adhesion of glass to polyethylene is greater than about 46 pounds of force per 0.5 inches of embedded strand.

14. The flexible reinforcement member of claim 8, wherein said high molecular weight polymer comprises an ethylene acrylic acid polymer.

* * * * *